United States Patent [19]
Hoggatt

[11] 3,939,024
[45] Feb. 17, 1976

[54] STRUCTURAL REINFORCED THERMOPLASTIC LAMINATES AND METHOD FOR USING SUCH LAMINATES
[75] Inventor: John T. Hoggatt, Kent, Wash.
[73] Assignee: The Boeing Company, Seattle, Wash.
[22] Filed: Apr. 10, 1974
[21] Appl. No.: 459,463

[52] U.S. Cl. ............. 156/242; 156/306; 156/309; 264/258; 428/225; 428/252; 428/285; 428/457; 428/902
[51] Int. Cl.² .......................................... B29B 1/00
[58] Field of Search ............ 161/55, 57, 58, 59, 88, 161/89, 98, 143, 144, 196, 212, 214; 156/177, 178, 181, 242, 245, 306, 309; 264/258; 428/225, 252, 285, 457, 902

[56] References Cited
UNITED STATES PATENTS

| | | |
|---|---|---|
| 3,551,268 | 12/1970 | Casadevall............................. 161/89 |
| 3,573,123 | 3/1971 | Siegel et al. ......................... 156/190 |
| 3,616,045 | 10/1971 | Kozar et al. ......................... 156/155 |
| 3,629,049 | 12/1971 | Olcott................................. 161/143 |
| 3,700,535 | 10/1972 | McCoy et al. ........................ 161/59 |
| 3,755,060 | 8/1973 | Bullock............................... 161/57 |
| 3,768,760 | 10/1973 | Jensen ................................ 161/55 |
| 3,779,851 | 12/1973 | Hertz ................................. 161/57 |

Primary Examiner—George F. Lesmes
Assistant Examiner—James J. Bell
Attorney, Agent, or Firm—Brown, Murray, Flick & Peckham

[57] ABSTRACT

Structural reinforced thermoplastic laminates capable of supporting loads in at least two directions and containing by volume about 45% to 65% fiber reinforcement. The laminates can be used with or without metal cladding.

3 Claims, 3 Drawing Figures

STRUCTURAL REINFORCED THERMOPLASTIC LAMINATES AND METHOD FOR USING SUCH LAMINATES

BACKGROUND OF THE INVENTION

In the past, graphite reinforced composites utilized for aircraft structural applications such as stabilizers, flaps and the like have been made with a thermosetting resin matrix. Each part is hand laid up, bagged and cured in an autoclave. One difficulty with such thermosetting laminates, however, is that once the laminate has been formed into a desired shape, it cannot be reprocessed if defects are present. Consequently, when a thermosetting composite is employed, the entire part must be scrapped or subjected to expensive repair procedures if it is defective. Another disadvantage of thermosetting resins is that in order to form the laminate, a reinforcement must be preimpregnated with the thermosetting resin, laminated and then cured with heat and pressure. The amount of heat and heating time employed and the pressure during cure are extremely critical since care must be taken to insure that the curing reaction proceeds at the proper rate. Furthermore, the thermosetting preimpregnated reinforcements have a finite shelf life, usually 6 to 12 months.

Such laminates can be used alone or with metal cladding. Metal-clad fiberglass laminates and the like have been used primarily in aircraft construction in attachment areas, shear panels and access areas. The advantage metal-clad laminates have over single composites is that they enable more reliable and more conventional attachment techniques such as bolting, riveting and the like. Furthermore, they improve load transfer characteristics and have better abrasion and damage resistance. Here again, however, because of the permanent set of a thermosetting resin, metal-clad laminates have been limited to flat or relatively simple contours and constructions; and it has not been possible to form thermosetting composite laminates by heat and pressure from a flat configuration.

In the past, formable metal-clad composite laminates using thermoplastic resins have been employed; however these relatively low fiber reinforcement volumes are not ordinarily utilized as structural components.

SUMMARY OF THE INVENTION

In accordance with the present invention, a structural reinforced thermoplastic laminate is provided which overcomes the disadvantages of thermosetting structural laminates heretofore utilized. Specifically, the invention resides in the discovery that strengths comparable to those of thermosetting structural reinforced laminates can be achieved by utilizing a thermoplastic material reinforced with 45% to 65% by volume of fiber reinforcement. At the same time, the use of a thermoplastic material enables the material to be post-formed after the initial laminate is formed; and the shelf life of the material is almost infinite in contrast to thermosetting materials.

Further, in accordance with the invention, a method is provided for fabricating a skeletal structure having an outer skin attached thereto by the steps of impregnating fiber reinforcing material in web-form with a thermoplastic material such that the fiber reinforcing material constitutes about 45% to 65% of the total volume of the impregnated material. Thereafter, the webs are overlapped and formed into an essentially planar composite laminate under heat and pressure. Finally, the laminate is formed into a desired shape and secured to the skeletal structure.

The above and other objects and features of the invention will become apparent from the following detailed description taken in connection with the accompanying drawings which form a part of this specification, and in which.

Figure 1:
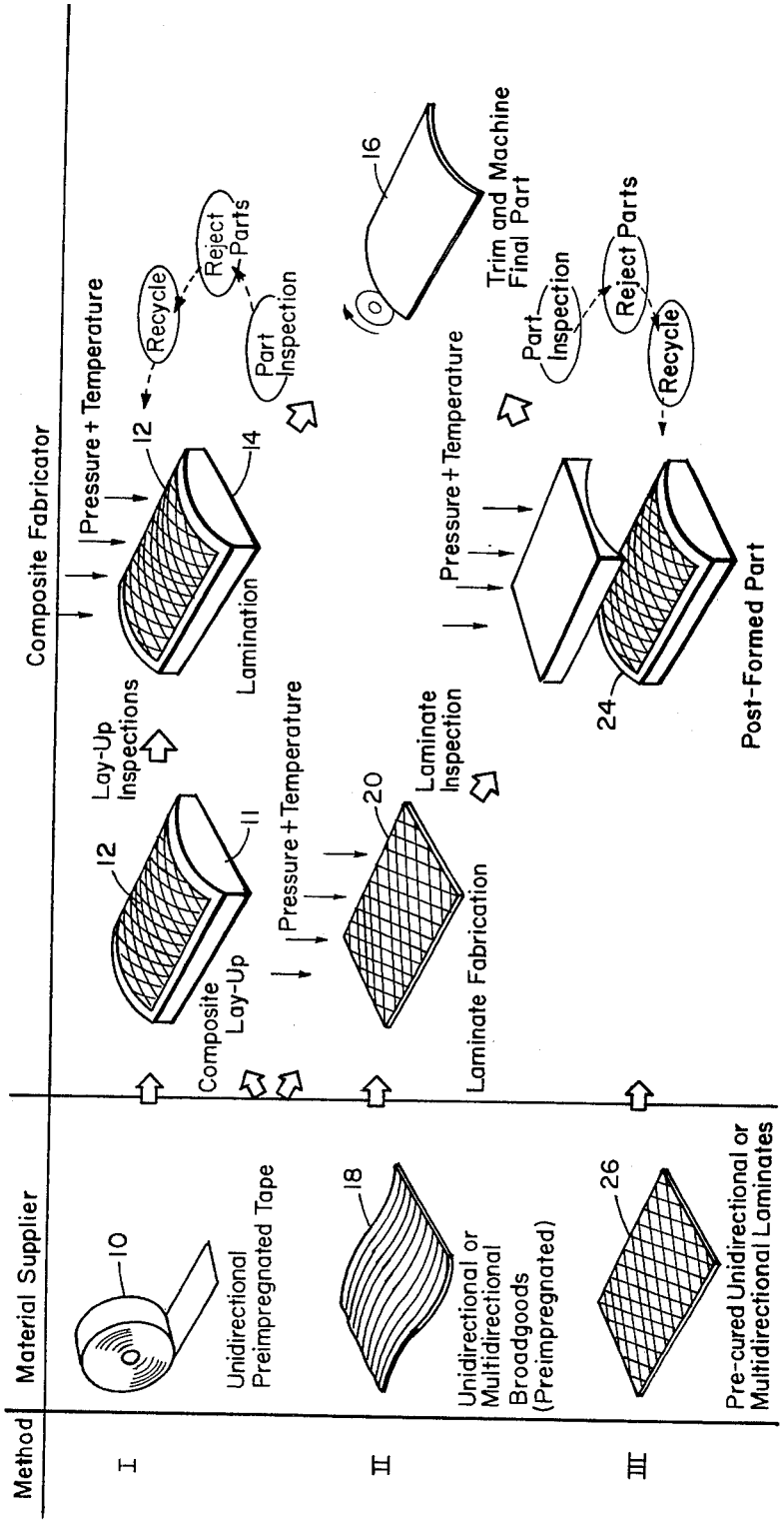
FIG. 1 is a schematic illustration of the method by which the plastic laminates of the invention can be formed from pre-impregnated tape, pre-impregnated broad goods material and pre-cured unidirectional or multidirectional laminates.

With reference now to the drawings, and particularly to FIG. 1, the laminates of the invention can be formed from unidirectional (i.e., the fibers run in one direction) preimpregnated tape 10, the tape being impregnated with a thermoplastic material such that the fiber content of the article is about 45% to 65% of the total volume of the tape. The thermoplastic material may, for example, comprise a phenoxy, a polysulfone, a polyarylsulfone, a polyethersulfone, a polyimide, a polyquinoxaline, a polyphenylquinoxaline, a polyphenylene oxide or a polyphenyl sulfide. The reinforcing or fiber material that can be used for primary structural applications includes graphite reinforcements (both filament and fabric), boron, and KEVLAR-49 (Trademark) (both filmament and fabric) manufactured by the Dupont Company. The specific thermoplastic material or reinforcement fiber depends upon the service temperature and environment of the proposed structure. In all cases, however, the plastic used is thermoplastic as contrasted with a thermosetting material.

The tape 10, for example, may then be formed into a composite lay-up 12 on a form or base plate 11. The individual plies of tape, placed one above the other, are crisscrossed as shown in order to improve the strength of the article in all directions along its edges. This laminate 12 can then be formed under pressure and temperature on a platen 14 into a desired shape, whereupon it is trimmed and machined as at 16 into a desired final part. Alternatively, instead of using the tape 10, unidirectional or multidirectional broad goods 18 impregnated with a suitable thermoplastic material can be processed as at 20 into a suitable, unformed laminate. This same laminate can be formed by subjecting the composite lay-up 12 to pressure and temperature before forming. That is, it is formed flat. In any case, the laminate again contains 45% to 65% by volume of fiber reinforcement material. The laminate 20 can then be formed under heat and pressure as at 24 into a desired shape and thereafter trimmed and machined as at 16.

Still another possibility is to form a pre-cured unidirectional or multidirectional laminate 26 of fibrous material (45% to 65% by volume) impregnated with a suitable thermoplastic material. This, then, can be formed directly as at 24 and trimmed and machined as at 16. Since the matrix materials are thermoplastic rather than thermosetting, the laminates can be reprocessed if defects are present. This is an extremely important feature in reducing production costs since scrappage can be reduced to a minimal level. With a thermosetting composite, on the other hand, the entire part must be scrapped if it is defective. As was mentioned above, another savings is in basic pre-impregnated storage. In practice, the resin is pre-impregnated into the tape 10 or the broad goods 18, for example, from a solvent solution on rolls of reinforcement. The solvent is thereafter driven off by heat. The amount of heat and heating time, however, are not critical as in the case of thermosetting resins since there is no curing reaction that might progress too far. Since there is no curing reaction, the shelf life of the impregnated reinforcement is infinite under any storage conditions. Thermosetting pre-impregnated reinforcements, on the other hand, must be scrapped after 6 to 12 months storage time.

Figure 2:
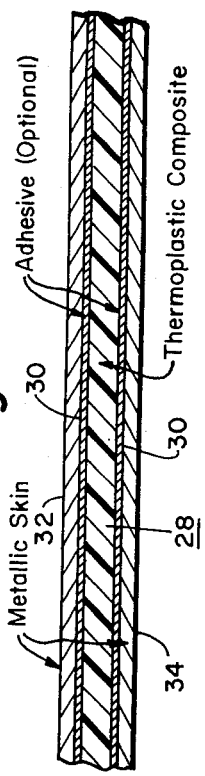
FIG. 2 is an illustration of an embodiment of the invention wherein the reinforced thermoplastic laminate is metal clad.
Figure 3:
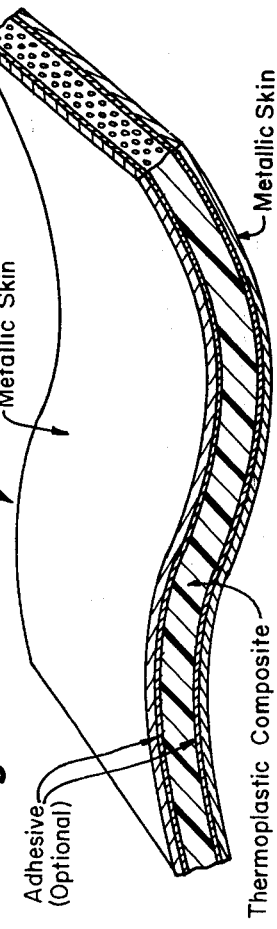
FIG. 3 illustrates the manner in which the metal-clad laminate of FIG. 2 can be post-formed into a desired shape.

With reference now to FIG. 2, a thermoplastic composite 28 is shown which may be similar to those illustrated in FIG. 1. Bonded to the opposite sides of the composite 28, by a thermosetting or thermoplastic adhesive 30, are two metallic sheets 32 and 34. The adhesive 30 will not be necessary in those cases where the thermoplastic material itself is tacky and will adhere to the metallic sheets. Due to the ductility and post-forming capability of the thermoplastic composite 28, it can be cold-formed or hot-formed into complex contours without damage to either the metal or the composite. Through proper selection of metallic alloys and composite reinforcement and fiber orientation, the strength and stiffness of the panel, such as that shown in FIG. 3, can be tailored for a given application, the panel 36 shown in FIG. 3 being formed from the laminate of FIG. 2.

In preparing the metal-clad laminate of FIG. 2, the metallic sheets 32 and 34 are first cleaned, primed with an adhesive, either thermoplastic or thermoset depending upon the properties desired, and then laminated under heat and pressure into the thermoplastic composite 28. If a thermoset adhesive is used, it is precured on the metal. The concept described herein offers a high strength, high modulus, low weight and low cost material for many commercial and military applications. In the commercial field, it can be used effectively for vehicle bodies, frames and panels, for aircraft skins and substructural elements. It can also be used in hydrofoils, rapid transit cars, automobiles and in the construction field. The plastic materials which can be used in the embodiment shown in FIGS. 2 and 3 include polysulfones, phenoxys, acrylonitrile-butadiene-styrenes, acetals, acrylics, fluorocarbons, nylon, polycarbonate, polyethers, polyethylene, polyimides, polyphenylene oxide, polypropylene, polyphenylquinoxalines, quinoxalines, polyvinyl chloride, and other thermoplastic and situ-thermoplastic materials. Reinforcements include graphite, boron and KEVLAR-49 (Trademark) fibers manufactured by the DuPont Company.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. The method for fabricating a skeletal structure having an outer skin attached thereto consisting essentially of impregnating webs of fiber reinforcing material with a thermoplastic material such that the fiber reinforcing material constitutes about 45% to 65% of the total volume of the impregnated webs, overlapping said webs to form a composite lay-up, forming under heat and pressure a composite essentially planar laminate from the overlapped webs, permitting said thermoplastic material to harden, thereafter forming said planar laminate under heat and pressure into a desired shape, and securing said desired shape between metal cladding to said skeletal structure.

2. The method of claim 1 wherein said metal cladding is secured to opposite sides of said laminate before the laminate is formed into a desired shape under heat and pressure.

3. The method of claim 1 wherein said impregnated reinforcing material is overlapped in a crisscross pattern.

* * * * *